United States Patent [19]
Webb et al.

[11] Patent Number: 5,458,450
[45] Date of Patent: Oct. 17, 1995

[54] PRESSURE-VACUUM RATED FLEXIBLE CONNECTOR FOR USE IN MATERIAL HANDLING SYSTEMS

[75] Inventors: Donald J. Webb; James Green, both of Baton Rouge, La.

[73] Assignee: Exxon Chemical Patents Inc., Linden, N.J.

[21] Appl. No.: 59,619

[22] Filed: May 7, 1993

[51] Int. Cl.[6] .................................................. B65G 65/32
[52] U.S. Cl. ........................ 414/21; 414/199; 222/77
[58] Field of Search ....................... 414/21, 160, 199, 414/299; 222/58, 77; 193/25 C, 30; 110/101 CC

[56] References Cited

U.S. PATENT DOCUMENTS

| | | | |
|---|---|---|---|
| 3,881,610 | 5/1975 | Hessling | 414/299 X |
| 3,958,700 | 5/1976 | Fox et al. | 193/30 X |
| 4,066,175 | 1/1978 | Schulte | 414/199 |
| 4,071,166 | 1/1978 | Legille et al. | 414/21 X |
| 4,331,084 | 5/1982 | Fitch et al. | 110/186 |
| 4,373,451 | 2/1983 | Gardner et al. | 414/21 X |
| 4,528,848 | 7/1985 | Hafner | 73/218 |
| 4,714,396 | 12/1987 | Bernard et al. | 414/21 X |
| 4,728,240 | 3/1988 | Mahr et al. | 414/21 |
| 4,767,258 | 8/1988 | Solvi et al. | 414/786 |
| 4,774,893 | 10/1988 | Dumbaugh | 110/186 |
| 4,820,105 | 4/1989 | Legille et al. | 414/21 X |
| 4,829,911 | 5/1989 | Nielson | 110/234 |
| 4,844,289 | 7/1989 | Dumbaugh | 222/161 |
| 4,878,797 | 11/1989 | Lonardi | 414/161 |
| 4,942,953 | 7/1990 | Chefson | 193/25 C |
| 5,046,643 | 9/1991 | Dumbaugh | 222/161 |

Primary Examiner—Michael S. Huppert
Assistant Examiner—James Keenan
Attorney, Agent, or Firm—Richard D. Jordan

[57] ABSTRACT

A flexible connector assembly comprising a flexible material which is substantially resistant to temperature and acid/solvent fumes, and a telescopic assembly comprising first and second upper end flanges, and first and second lower end flanges, wherein an inner sleeve is connected to the first upper end flange, a first outer sleeve is connected to the second upper end flange, and a second outer sleeve is connected to the second lower end flange, wherein the flexible material is disposed between the inner sleeve and the outer sleeves.

12 Claims, 7 Drawing Sheets

5,458,450

PRESSURE-VACUUM RATED FLEXIBLE CONNECTOR FOR USE IN MATERIAL HANDLING SYSTEMS

The present invention generally relates to a unique pressure-vacuum rated flexible connector assembly for use in material handling systems. The flexible connector assembly is particularly useful in systems which require a high level of weighing accuracy in a feed hopper disposed above a reactor. This flexible connector assembly comprises a flexible fabric resistant to temperature and acid/solvent fumes which is held by a perforated stainless steel, telescopic assembly.

BACKGROUND OF THE INVENTION

The use of flexible connector joints between a feed hopper and a reactor housing so that the feed hopper may be weighed separately from the reactor is well known, as evidenced by U.S. Pat. Nos. 4,331,084 (Fitch et al.), 4,528,848, which issued on May 25, 1982, (Häfner), which issued on Jul. 16, 1985, and 4,767,258 (Solvi et al.), which issued on Aug. 30, 1988.

U.S. Pat. No. 4,331,084 discloses a lower feed chute portion coupled to a weigh bin by means of a flexible, airtight seal so as not to support the weigh bin but only to guide the fuel into the inlet of the combustion chamber while simultaneously preventing ambient air from entering the combustion chamber.

U.S. Pat. No. 4,528,848 discloses a pneumatic conveying system comprising sealing elements, preferably semi-elastic or elastic seals, provided between the rotor and the housing. Materials which may be used as semi-elastic seals, are seals of tetrafluoroethylene or, respectively, polyurethane seals having approximately 90° shore hardness. Softer synthetic materials, such as rubber, natural caoutchouc, vinyl caoutchouc or felt gaskets may also be used as elastic seals.

U.S. Pat. No. 4,767,258 discloses a storage chamber, feed hopper and furnace separated from each other by means of compensators in such a manner that the chamber and hopper may be weighed separately by means of pressure cells.

The aforementioned patents disclose various flexible connectors disposed between hoppers and reactors. However, these flexible connectors have been found to be inadequate for weighing and delivering soda ash in a plasticizer process. Plasticizer reactors have a design rating of $1.724 \times 10^5 N/m^2$ at 195° C. (i.e., 25 psig/FV at 352° F.). The normal maximum working temperature is 183° C. (330° F.). The materials handled by plasticizer reactors and hoppers necessitate a flexible connector which is resistant to solvent, acids and other chemicals. Conventional connectors called upon to contain pressure and/or vacuum typically have a rigidity which introduces an error in the weighing of the material in the hopper. This is especially true if either the receiver or the weigh hopper move with respect to one another (i.e., sudden thermal growth, wind effects, sudden charging of one vessel, etc.).

The present inventors have designed a flexible connector assembly which is rated to withstand increased pressure and vacuum, and which is also temperature and acid/solvent resistant. The device according to the present invention comprises a flexible fabric resistant to temperature and acid/solvent fumes held in a perforated stainless steel, telescopic assembly. The fabric is fastened at each end flange, and is restrained outwardly by telescoping sleeves or shrouds and inwardly by a perforated metal inner sleeve or shroud. A Teflon® tube or chute is held inside the assembly to prevent soda ash from building up on the perforations or fabric. This "sock" design has successfully proven that 204.12 to 272.16 kg (i.e., 450 to 600 lb.) charges can be conveyed and charged into the reactor and be proven within 0.91 kg (i.e., 2 lbs.) of the target weight.

The present invention also provides many additional advantages which shall become apparent as described below.

SUMMARY OF THE INVENTION

A flexible connector assembly comprising a flexible material which is substantially resistant to temperature and acid/solvent fumes and a telescopic assembly which encases the flexible material. The telescopic assembly comprises first and second upper end flanges, and first and second lower end flanges, wherein an inner sleeve is connected to the first upper end flange, a first outer sleeve is connected to the second upper end flange, and a second outer sleeve is connected to the second lower end flange. The flexible material is disposed between the inner sleeve and the outer sleeves so as to protect it from changes in pressure and vacuum. Optionally, a polytetrafluoroethylene tube or chute may be disposed within the inner sleeve to protect the sleeves and flexible material from surface build up of the pourable material.

The present invention also pertains to a system for continuous gravimetric metering and conveying of pourable material which comprises: a reactor; a hopper which is capable of delivering the pourable material to the reactor; a weighing means connected to the hopper and which is capable of detecting the weight of the pourable material contained within the hopper; a flexible connector assembly disposed between the reactor and the hopper which is capable of moving along its vertical axis without imparting any load variation to the weighing means. This system is particularly suited for plasticizer processes wherein soda ash must be delivered to the plasticizer reactor in predetermined amounts.

Other and further objects, advantages and features of the present invention will be understood by reference to the following specification in conjunction with the annexed drawings, wherein like parts have been given like numbers.

DESCRIPTION OF THE PREFERRED EMBODIMENTS

The flexible connector assembly of the present invention includes a flexible fabric (material) resistant to temperature and acid/solvent fumes held in a perforated stainless steel, telescopic assembly. The fabric is fastened at each end flange and horizontally restrained by the telescoping sleeves.

The flexible fabric (material) is preferably a fluoroelastomer such as chlorotetrafluoroethylene (e.g., Viton® manufactured by DuPont) which is molded in seamless construction. Other fabrics such as butyl rubbers, natural rubbers, nitriles, ethylene propylene diene mononers, chlorine sulfonyl polyethylenes, styrene-butadienes, polysulfide rubbers and neoprenes (e.g., an aluminized fiberglass veil with a neoprene inner liner) may also be used. Still other fabrics known to be flexible, lacking in fatigue characteristics, impervious to gases, and strong may also be used herein.

Figure 1:
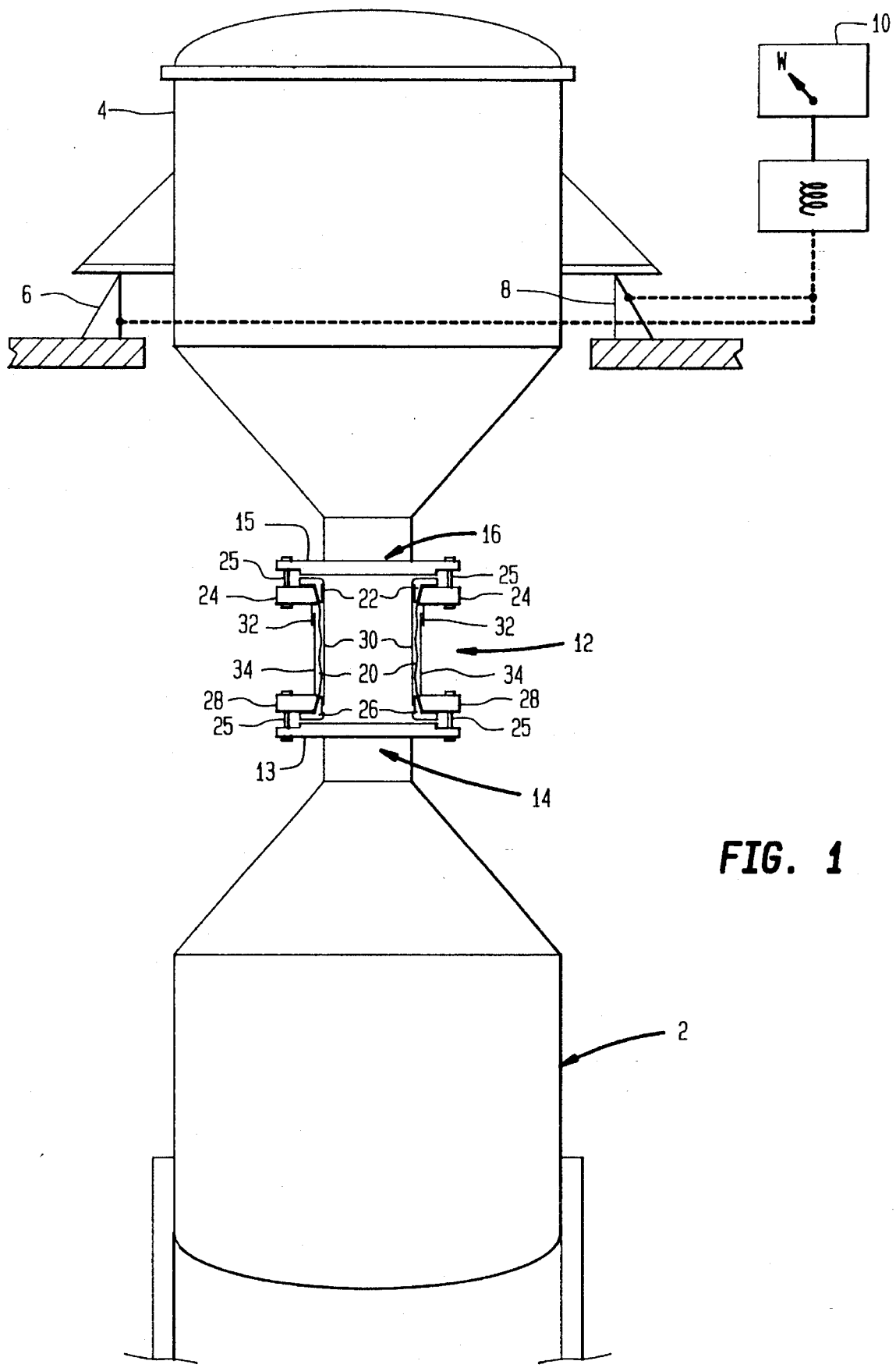
FIG. 1 is a schematic representation of a system which includes a weigh hopper joined to a reactor by means of a flexible connector assembly according to the present invention.
Figure 2:
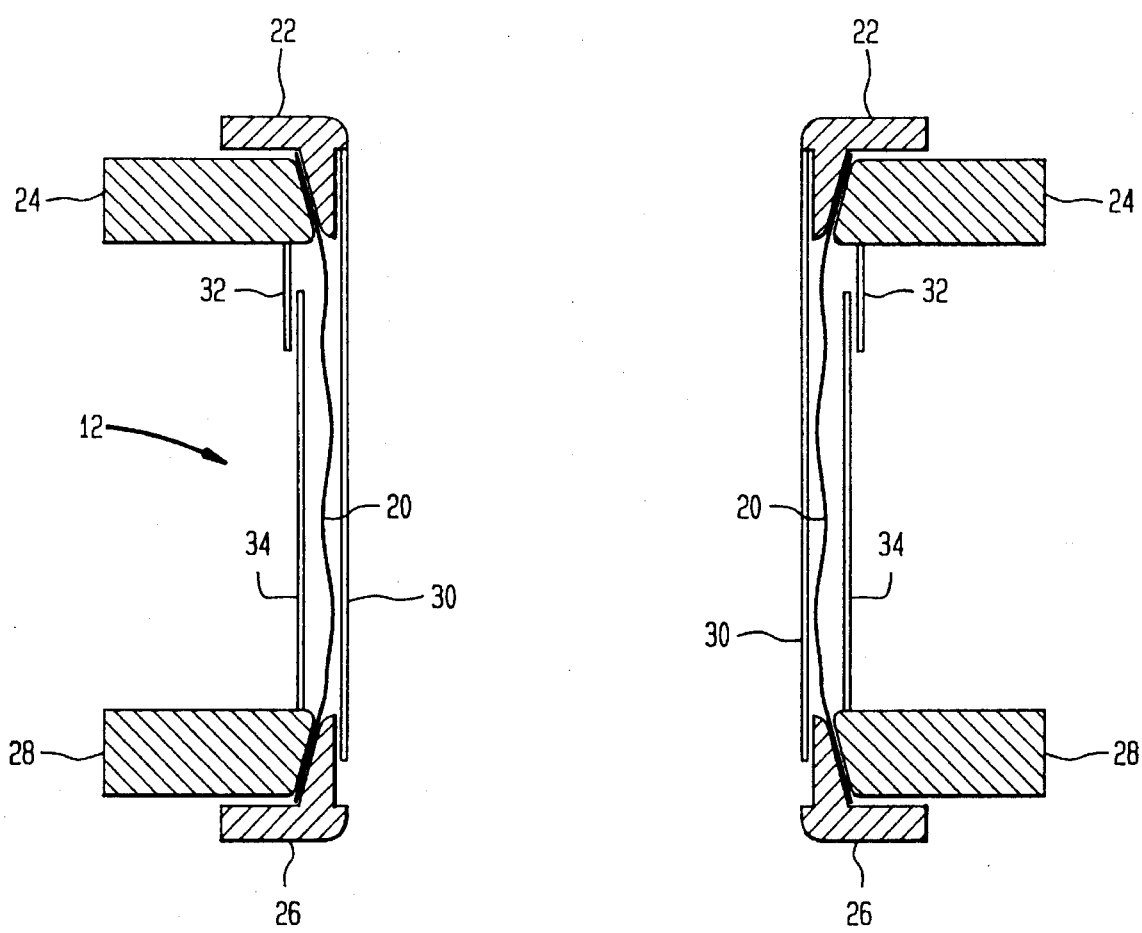
FIG. 2 is a schematic representation of a cross-sectional view of the flexible connector assembly according to the present invention.

This invention can best be described by reference to the attached drawings, wherein FIG. 1 depicts a system for continuous gravimetric metering and conveying of pourable material which comprises a reactor 2, a hopper 4, weighing means 6 and 8 which are capable of detecting the weight of the pourable material contained within hopper 4 and reporting it via output detector 10, and a flexible connector assembly 12 disposed between a feed conduit 14 of reactor 2 and a discharge conduit 16 of hopper 4. Flexible connector assembly 12 must be capable of moving along its vertical axis without imparting any load variation to weighing means (6,8).

As illustrated in FIGS. 2-6, flexible connector assembly 12 comprising a flexible fabric or material 20, and a telescopic assembly which comprises first upper end flange 22 and second upper end flange 24, and first lower end flange 26 and second lower end flange 28, wherein an inner sleeve 30 is connected to first upper end flange 22, a first outer sleeve 32 is connected to second upper end flange 24, and a second outer sleeve 34 is connected to second lower end flange 28, wherein flexible material 20 is disposed between inner sleeve 30 and the outer sleeves (32,34).

The end flanges are preferably compression cones, i.e., the tapered sections of these flanges are machined as concentric cones which compress and grip the flexible fabric when the end flanges are fastened to adjacent piping flanges. That is, as bolts 25 are tightened about piping flange 15 of discharge conduit 16 and upper end flange 24 and about piping flange 13 of feed conduit 14 and lower end flange 28, respectively, end flanges (22,26) are caused to compress against their respective opposite end flanges (24,28), thereby securely gripping flexible fabric 20.

Flexible material 20 is fixingly disposed at one end between the first and second upper end flanges (22,24) and at the opposite end between the first and second lower end flanges (22,28).

Figure 3:
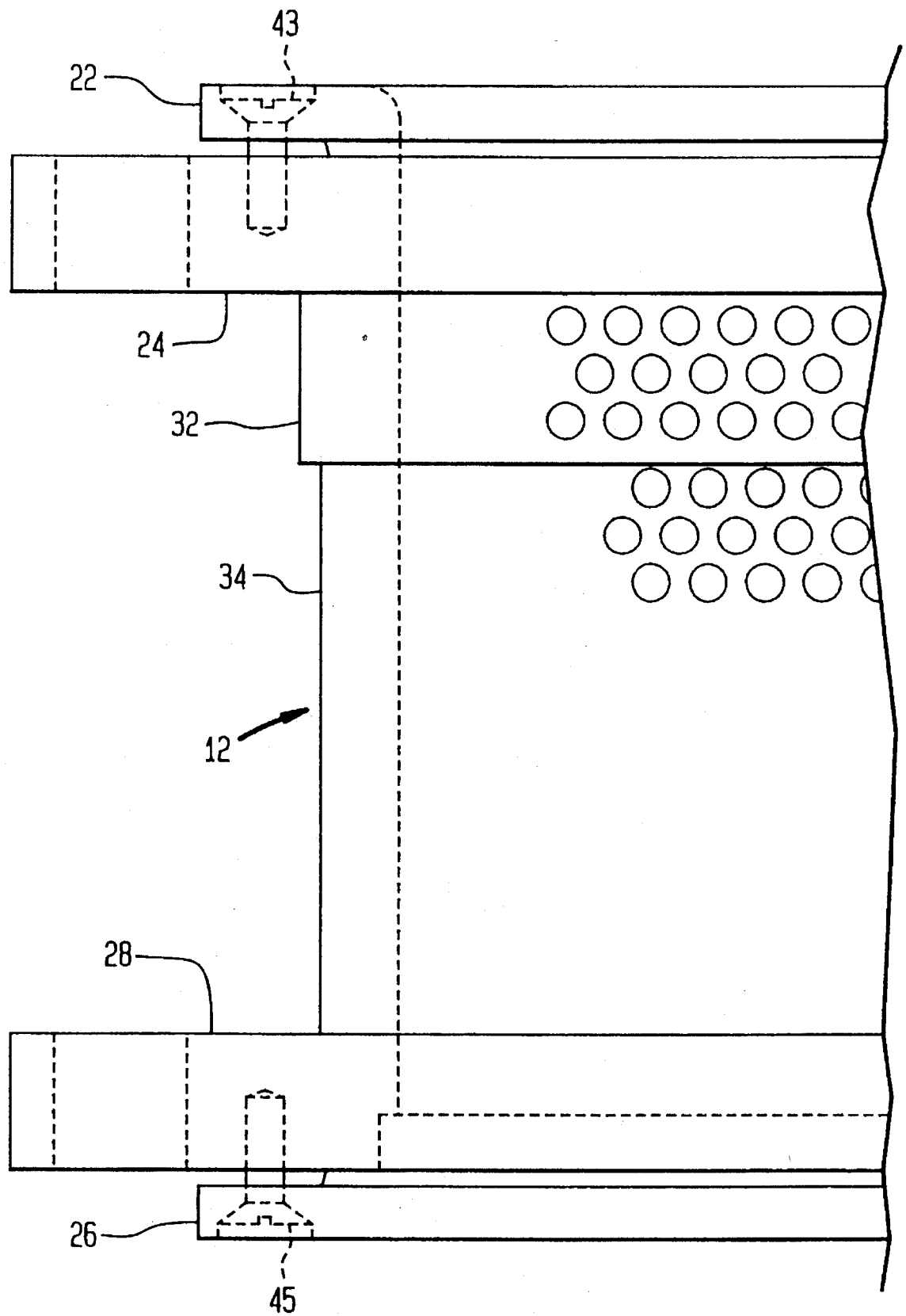
FIG. 3 is a schematic representation of a partial side view of the flexible connector assembly according to the present invention having perforated metal sleeves.

Inner sleeve 30 and outer sleeves (32,34) are preferably formed of perforated metal as shown in FIG. 3. The perforated metal is typically stainless steel.

Flexible material 20 is a fabric which is substantially resistant to temperature and acid/solvent fumes, e.g., a seamless fluoroelastomer "sock".

Figure 6:
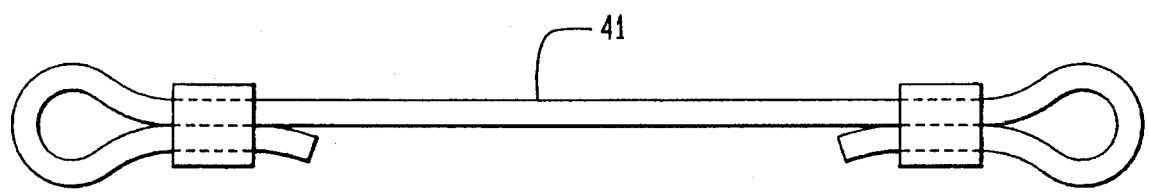
FIG. 6 is a schematic representation of the cable used in FIG. 8.
Figure 8:
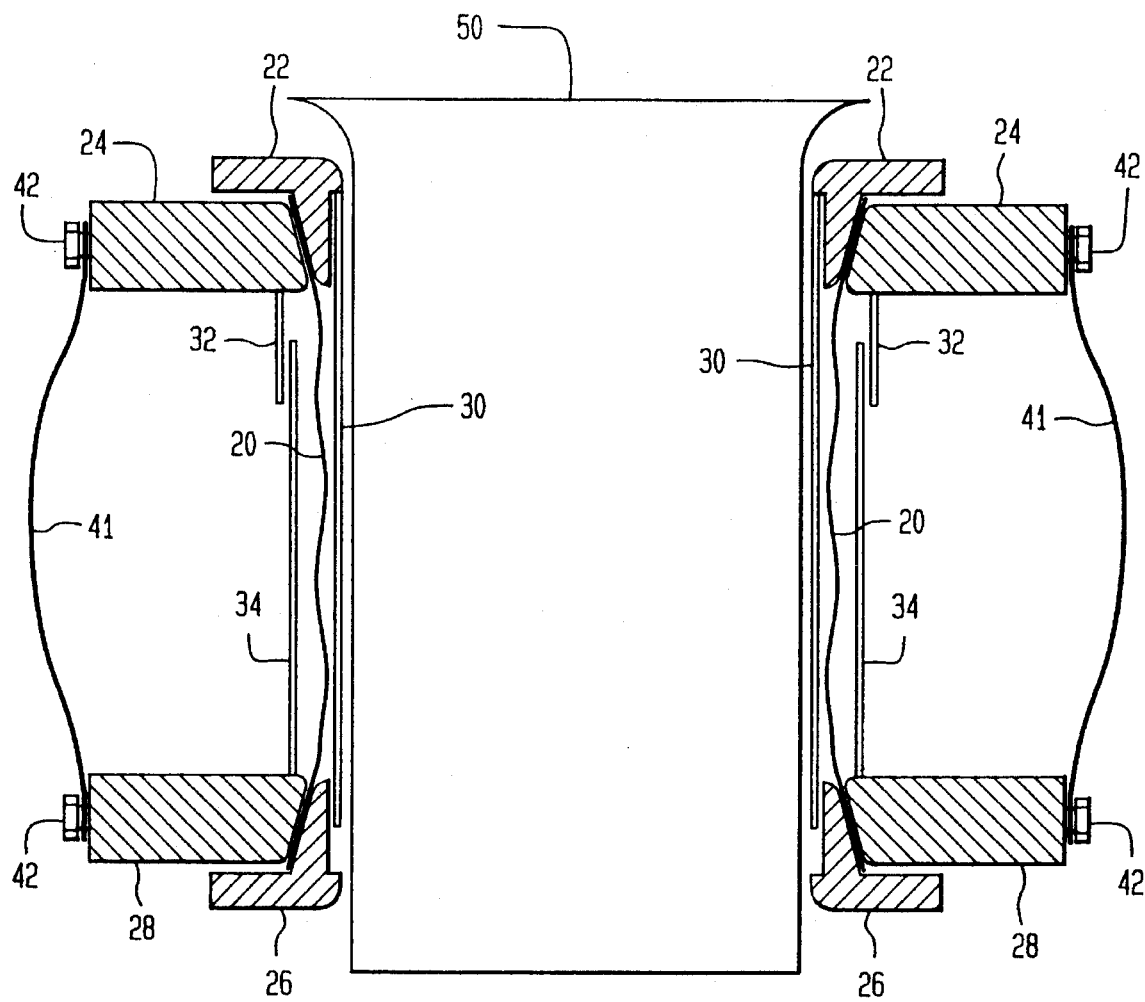
FIG. 8 is a schematic representation of a flexible connector assembly in accordance with another embodiment of the present invention, wherein a polytetrafluoroethylene tube or chute is disposed within the inner sleeve to prevent feed material build up on the sleeves or flexible material.

As illustrated in FIGS. 6 and 8, it is optional to attach a cable 41 to second upper end flange 24 and second lower end flange 28 by screws 42 in order to provide the telescoping assembly with a limited vertical extension. Moreover, first upper end flange 22 is connected to second upper end flange by screw 43, and first lower end flange 26 is connected to second lower end flange 28 by screw 45. It should be noted that screws 43 and 45 are used only for holding the flexible material in place while assembling the device. Once the device is installed in the piping system, the connecting pipe flanges (13,15) crimp the fabric by compressing end flanges 22 and 26. Upon compression screws 43 and 45, which are counter-sunk in the their respective upper flanges, actually no longer act to hold the upper flanges together.

Figure 4:
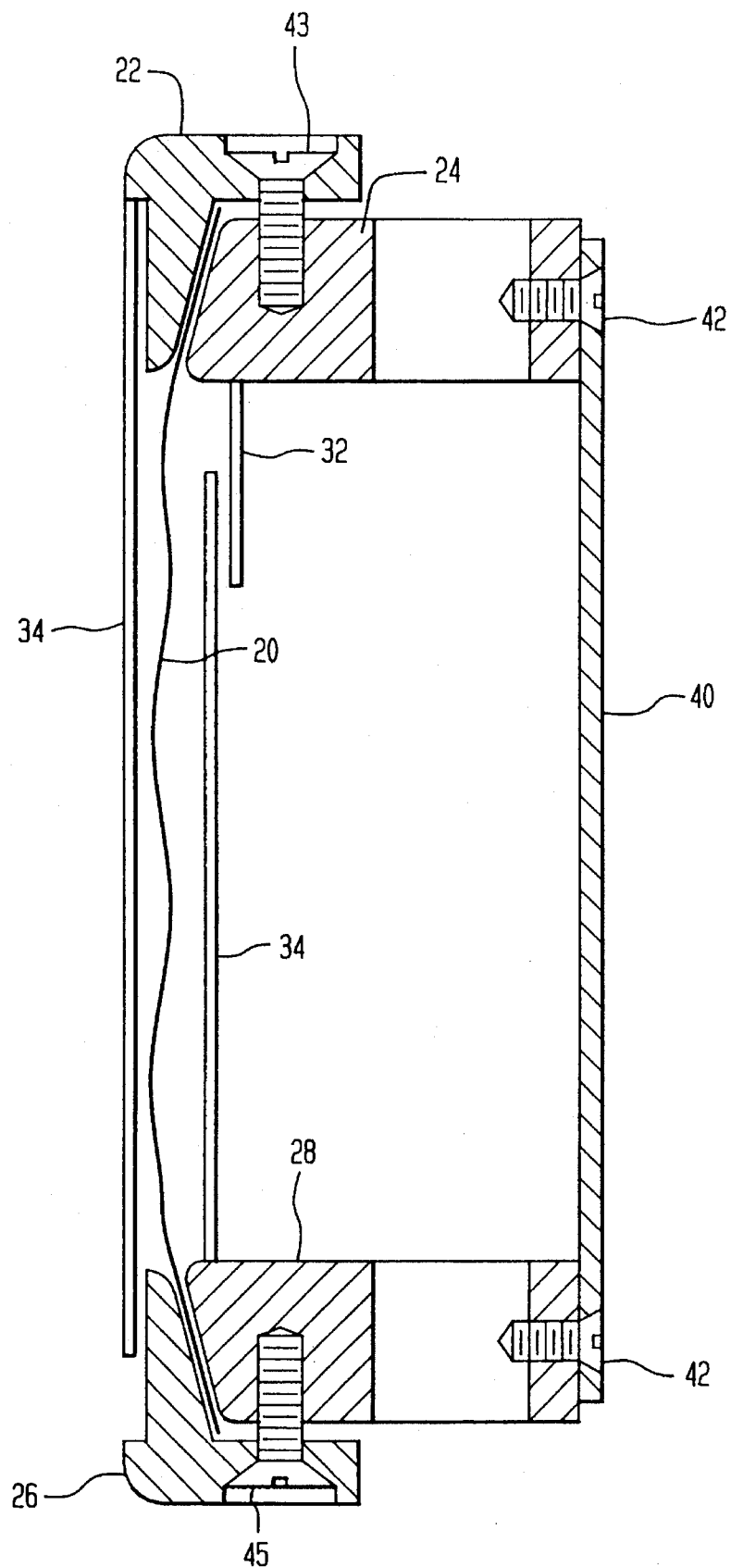
FIG. 4 is a schematic representation of the flexible connector assembly according to the present invention wherein the flexible material is fixingly disposed between the flange ends.
Figure 5:
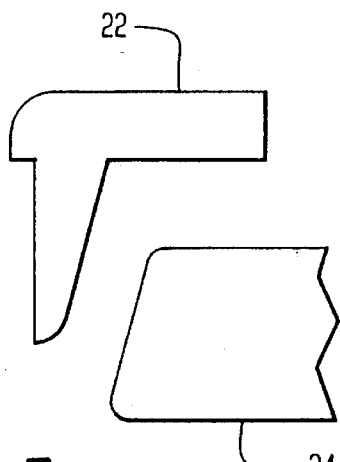
FIG. 5 is a schematic representation of a pair of oppositely disposed end flanges.

The flat bar 40 of FIG. 4 is used on installation of the assembly so that the neutral position of the assembly is maintained. The cable 41 replaces flat bar 40 once the assembly is installed. Cables 41 allow movement but prevent over extension of the telescoping assembly.

FIG. 8 depicts another preferred embodiment according to the present invention wherein a tube 50 is disposed within inner sleeve 34. Tube 50 is preferably a polytetrafluoroethylene (Teflon®) tube capable of preventing pourable material such as soda ash from building up on the surfaces of any of the sleeves or flexible material 20.

Figure 7A:
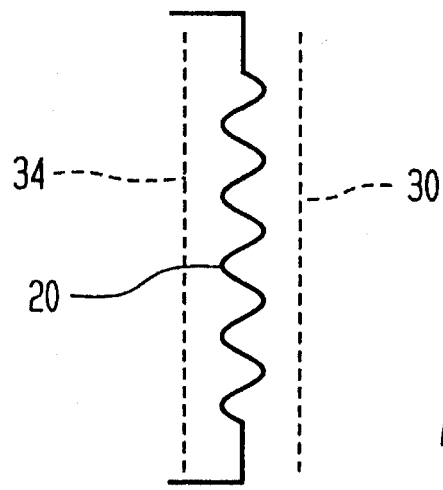
FIG. 7a is a schematic representation of a flexible material disposed between an outer sleeve and an inner sleeve under atmospheric conditions.
Figure 7B:
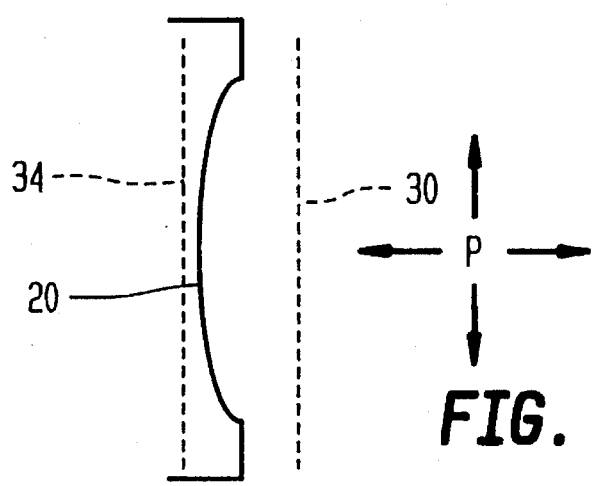
FIG. 7b is a schematic representation of a flexible material disposed between an outer sleeve and an inner sleeve under pressurized conditions.
Figure 7C:
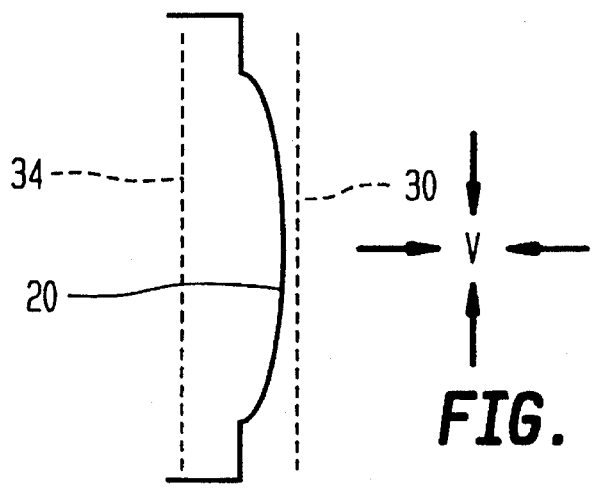
FIG. 7c is a schematic representation of a flexible material disposed between an outer sleeve and an inner sleeve under vacuum.

FIGS. 7a–7c illustrate the containment effect which inner sleeve 30 and outer sleeve 34 have on flexible fabric or material 20 under atmospheric, pressurized or vacuum conditions. That is, under pressurized conditions flexible fabric 20 is forced outwardly, but its outward movement is limited by the position of the outer sleeve 34. Under vacuum conditions flexible fabric 20 is forced inwardly only so far as the location of the inner sleeve 30. Therefore, sleeves 30 and 34 provide diametrical restraint to flexible fabric 20, thereby protecting it from high pressures and vacuums. These sleeves also provide support for flexible fabric 20 without effecting the vertical movement of the flexible connector assembly.

While we have shown and described several embodiments in accordance with our invention, it is to be clearly understood that the same are susceptible to numerous changes apparent to one skilled in the art. Therefore, we do not wish to be limited to the details shown and described but intend to show all changes and modifications which come within the scope of the appended claims.

What is claimed is:

1. A system for continuous gravimetric metering and conveying of pourable material which comprises:

a reactor;

a hopper which is capable of delivering said pourable material to said reactor;

a weighing means connected to said hopper, said weighing means is capable of detecting the weight of said pourable material contained within said hopper;

a flexible connector assembly disposed between said reactor and said hopper which is capable of moving along its vertical axis without imparting any load variation to said weighing means, said flexible connector assembly comprising: a flexible material and a telescopic assembly, said telescopic assembly comprises first and second upper end flanges, and first and second lower end flanges, wherein an inner sleeve is connected to said first upper end flange, a first outer sleeve is connected to said second upper end flange, and a second outer sleeve is connected to said second lower end flange, wherein said flexible material is disposed between said inner sleeve and the outer sleeves.

2. The system according to claim 1 wherein said flexible material is fixingly disposed at one end between said first and second upper end flanges and at the opposite end between said first and second lower end flanges.

3. The system according to claim 1 wherein said inner and outer sleeves are formed of perforated metal.

4. The system according to claim 3 wherein said perforated metal is stainless steel.

5. The system according to claim 1 wherein said flexible material is substantially resistant to temperature and acid/solvent fumes.

6. The system according to claim 5 wherein said flexible material is a fluoroelastomer.

7. The system according to claim 1 wherein said flexible material is impervious to gases.

8. The system according to claim 1 wherein said flexible material is a material selected from the group consisting of: butyl rubbers, natural rubbers, nitriles, ethylene propylene diene mononers, chlorine sulfonyl polyethylenes, styrene-butadienes, polysulfide rubbers and neoprenes.

9. The system according to claim 1 further comprising a tube means disposed within said inner sleeve.

10. The system according to claim 9 wherein said tube means is a polytetrafluoroethylene tube.

11. The system according to claim 1 wherein said pourable material is soda ash.

12. The system according to claim 1 wherein said reactor is a plasticizer reactor.

* * * * *